US009002739B2

(12) United States Patent
Shin et al.

(10) Patent No.: US 9,002,739 B2
(45) Date of Patent: Apr. 7, 2015

(54) METHOD AND SYSTEM FOR SIGNATURE CAPTURE

(71) Applicants: Scott H. Shin, Seoul (KR); Gavin Shenker, Los Angeles, CA (US); Douglas Stephen Deibert, Alameda, CA (US)

(72) Inventors: Scott H. Shin, Seoul (KR); Gavin Shenker, Los Angeles, CA (US); Douglas Stephen Deibert, Alameda, CA (US)

(73) Assignee: Visa International Service Association, San Francisco, CA (US)

( * ) Notice: Subject to any disclaimer, the term of this patent is extended or adjusted under 35 U.S.C. 154(b) by 112 days.

(21) Appl. No.: 13/708,096

(22) Filed: Dec. 7, 2012

(65) Prior Publication Data

US 2013/0148024 A1    Jun. 13, 2013

Related U.S. Application Data

(60) Provisional application No. 61/568,081, filed on Dec. 7, 2011.

(51) Int. Cl.
| | |
|---|---|
| *G06K 9/00* | (2006.01) |
| *G06K 9/20* | (2006.01) |
| *G06K 9/22* | (2006.01) |
| *G06K 9/36* | (2006.01) |
| *G06Q 20/40* | (2012.01) |
| *G06Q 20/38* | (2012.01) |

(Continued)

(52) U.S. Cl.
CPC .............. *G06Q 20/40* (2013.01); *G06Q 20/389* (2013.01); *G06Q 20/40145* (2013.01); *G06F 3/017* (2013.01); *H04N 5/44582* (2013.01)

(58) Field of Classification Search
CPC .................................. G06K 1/00; G06K 9/00
USPC ............................................................ 705/35
See application file for complete search history.

(56) References Cited

U.S. PATENT DOCUMENTS

| | | | |
|---|---|---|---|
| 5,603,078 | A | 2/1997 | Henderson |
| 6,970,854 | B2 | 11/2005 | Weigel |

(Continued)

FOREIGN PATENT DOCUMENTS

| | | | | |
|---|---|---|---|---|
| JP | 2001-266035 A | | 9/2001 | |
| WO | WO 2005/003863 A2 | * | 3/2005 | ............... G06F 3/00 |

(Continued)

OTHER PUBLICATIONS

International Search Report mailed Apr. 1, 2013 in PCT Application No. PCT/US2012/068569.

(Continued)

*Primary Examiner* — Clifford Madamba
(74) *Attorney, Agent, or Firm* — Kilpatrick Townsend & Stockton LLP

(57) ABSTRACT

Advanced internet-connected devices, such as smart TVs, can be used for conducting online transactions. Online transactions often lack an effective mechanism to prevent repudiation of the transaction. Signature data, representative of a consumer's signature motion, may be captured by a signature capture device. The signature capture device can be the smart TV or a device associated with the smart TV (e.g., a remote controller). The signature device can also be a security token. The signature data may be processed, stored, and/or transmitted for later use. The representation of the consumer's signature provides a non-repudiation mechanism similar in function to that of a consumer's actual handwritten signature on a credit card or debit card receipt.

17 Claims, 11 Drawing Sheets

(51) Int. Cl.
*G06F 3/01* (2006.01)
*H04N 5/445* (2011.01)

(56) References Cited

U.S. PATENT DOCUMENTS

| | | | |
|---|---|---|---|
| 7,269,854 | B2 | 9/2007 | Simmons |
| 7,707,120 | B2 * | 4/2010 | Dominguez et al. ............ 705/78 |
| 2003/0122804 | A1 | 7/2003 | Yamazaki |
| 2003/0163708 | A1 | 8/2003 | Tang |
| 2008/0126250 | A1 | 5/2008 | Chen |
| 2009/0262069 | A1 | 10/2009 | Huntington |
| 2011/0178881 | A1 | 7/2011 | Pulletikurty |
| 2011/0187642 | A1 | 8/2011 | Faith |
| 2011/0189981 | A1 | 8/2011 | Faith |
| 2012/0089519 | A1 * | 4/2012 | Peddada ........................ 705/71 |
| 2012/0310743 | A1 * | 12/2012 | Johri ......................... 705/14.58 |

FOREIGN PATENT DOCUMENTS

| | | | |
|---|---|---|---|
| WO | WO2005103863 A2 * | 3/2005 | ............... G06F 3/00 |
| WO | 2008-012609 A1 | 1/2008 | |

OTHER PUBLICATIONS

"Android Smart Television Box—Turn Your Tv Into a Smart Tv—Gtv220," Dealsdirect.com.au. Copyright © 2004-2013. Australia. http://www.dealsdirect.com.au/p/android-smart-television-box-turn-your-tv-into-smart-tv-gtv220/.

"Enjoy Smarter Viewing with Enhanced Content and Features," Samsung.com. Copyright © 1995-2013. http://www.samsung.com/in/consumer/tv-audio-video/television/led-tv/UA55ES8000RLXL-features#con02.

Caroline McCarthy."Twitter co-founder's 'Square' comes into focus," news.cnet.com, Oct. 17, 2009. http://news.cnet.com/8301-13577_3-10377405-36.html.

* cited by examiner

1. Selection of item to purchase

2. Cardholder to decide on payment form factor

3. Authorization Request/Card Data Authentication

4. Authorized Transaction

5. Request for Cardholder Verification

6. Signature Captured

METHOD AND SYSTEM FOR SIGNATURE CAPTURE

CROSS-REFERENCE TO RELATED APPLICATIONS

The present application is a non-provisional application of and claims priority to U.S. Provisional Application No. 61/568,081, filed on Dec. 7, 2011, the entire contents of which are herein incorporated by reference for all purposes.

BACKGROUND

The present disclosure relates generally to methods and systems for signature capture.

Internet connected devices can be used for online shopping and to conduct payment transactions. Conventional approaches to enabling a consumer to conduct a payment transaction using a smart TV or similar device often lack an effective mechanism to prevent repudiation of the transaction. This is a disadvantage of these conventional approaches because a non-repudiation mechanism protects the issuer of a payment device by preventing a consumer from alleging that they were not the party who conducted a transaction when in fact they were. Non-repudiation mechanisms may also prevent parties other than the owner of a payment account from conducting transactions, for example, because the non-repudiation mechanism may provide proof that the party conducting the transaction was not the account owner.

Embodiments of the invention address these and other problems both individually and collectively.

SUMMARY

In a typical use case, a consumer interacts with a smart TV or similar device to navigate to a screen that displays items for purchase. For example, the screen may display applications, services, products, or content for purchase. Once the consumer selects an item to purchase, the transaction system may provide a payment or transaction identifier, which typically serves to uniquely identify the transaction and provides a way to access data regarding the transaction, such as the purchased item, the price, the IP address of the purchaser, etc. The payment or transaction identifier may be included in data passed to a transaction processing network by a payment application during a payment approval process. Prior to approving the payment, the consumer may be asked to provide data regarding the payment account they wish to use to make the purchase (e.g., an account identifier, PAN, etc.).

In some embodiments, the account data may be provided from a memory in the smart TV or from a server that is connected to the smart TV via the Internet. The account data may also be provided by the consumer using a remote control or other input device for the smart TV that includes a data storage element and an element capable of communicating with the consumer's portable consumer device. The portable consumer device can incorporate smart card technology (or other form of "chip" card) using the EMV standard, contactless technology (e.g., ISO 14443), Near Field Communication technology (NFC) or another suitable communications method. The interface between the consumer's payment device and the remote control may be in the form of a physical contact between the payment device (e.g., a smart card) and a remote control or other input device for the smart TV.

In some embodiments, the payment account data may be transferred from the consumer's portable consumer device to the data storage element of the remote control and then from the remote control to the smart TV. The payment account data (which may include a payment account identifier, PIN, password, or the like) may be processed by a payment application or payment module installed in the smart TV and used to construct a payment transaction approval request message. The request message can be provided from the smart TV to an element of a payment transaction processing network (e.g., an acquirer) over the Internet. For example, the request message can initiate a transaction approval process such as might be used for a conventional credit card or debit card transaction. The transaction approval request can be processed to determine if the transaction is approved or denied. A transaction response message indicating the approval or denial of the transaction can be provided back to a client module (and/or the payment application) in the smart TV that was used to provide the consumer with a display of the available items.

At this point in the example transaction, a consumer has selected the item they desire to purchase and provided payment account data to the system. The system has generated a transaction request message and obtained approval (or denial) of the transaction using one or more elements of a payment transaction processing network (e.g., an acquirer, data processing elements operated by a payment processing organization, an issuer, etc.). The consumer has provided payment account information and in some cases may have provided identification information. However, the consumer typically has not provided a proof of identity that serves as an effective non-repudiation mechanism.

In some embodiments, if the transaction is approved, the smart TV will then display a form or data field into which the consumer's signature can be entered. The form or data field may be generated by the payment application module, by another application in the smart TV, or by one or more elements of the payment transaction processing network. The consumer's signature can be captured and serve as a non-repudiation mechanism for the payment transaction. In some embodiments, the consumer's signature may be captured using a sensor that is configured to detect motion of the remote control, the user, or both. In some embodiments, the sensor is a motion sensor in the remote control. The sensor may receive a signal from the remote control (such as a light signal or infrared signal) and may detect a motion as the consumer moves the remote control in a sequence of motions that represent the consumer's signature (e.g., a signature gesture). In some embodiments, the sensor may detect the motion of the consumer's hand and/or arm as the consumer "traces" their signature in the air. In some embodiments, the consumer may provide a user input to indicate to the system that he or she is providing his or her signature as part of conducting a payment transaction. For example, the consumer can depress one or more keys on a keypad of the remote control (or enter a specified data string). In some embodiments, there may be a predetermined time window for the consumer to provide the signature. In some embodiments, a voice command or physical gesture is used.

The consumer's signature motion can be perceived by the sensor and can be captured as a set of signature signals. These signals are processed by an application that can operate to interpret the signals as a representation of a signature. The representation of the signature can be processed into an image of that signature or another file or data element that represents the captured signature. In some embodiments, the signature image is inserted into an appropriate data field or section of the form displayed on the smart TV. In some embodiments, it is not displayed for security reasons.

In some embodiments, a method comprises receiving an input from a consumer to initiate a transaction at a computing device, generating a request for approval of the transaction, receiving a response to the request for approval of the payment transaction, detecting a motion of the consumer by a sensor, processing the detected motion to generate a representation of the consumer's signature, and inserting an image of the consumer's signature into a predetermined data field associated with a record of the payment transaction. The request may include a payment transaction identifier and payment account information. The response may indicate whether the payment transaction was approved or denied. Systems and devices for performing the method are also disclosed.

In some embodiments, a system comprises a computing device with a display, a payment application module, and a signature capture module. The computing device may have a display and be used to select one or more goods or services for purchase using a portable consumer device associated with a payment account. The payment application module may be configured to receive an input from a consumer to initiate a transaction, generate a request for approval of the transaction, and receive a response to the request for approval of the payment transaction. The signature capture module may be configured to detect a motion of the consumer, process the detected motion, and generate an electronic representation of the consumer's signature. The electronic representation of the consumer's signature may be inserted into a predetermined data field associated with a record of the payment transaction. In some embodiments, the payment application module and/or the signature capture module may be included in a smart TV. In some embodiments, the payment application module and/or the signature capture module may be included in a remote control device.

DETAILED DESCRIPTION

Figure 1:
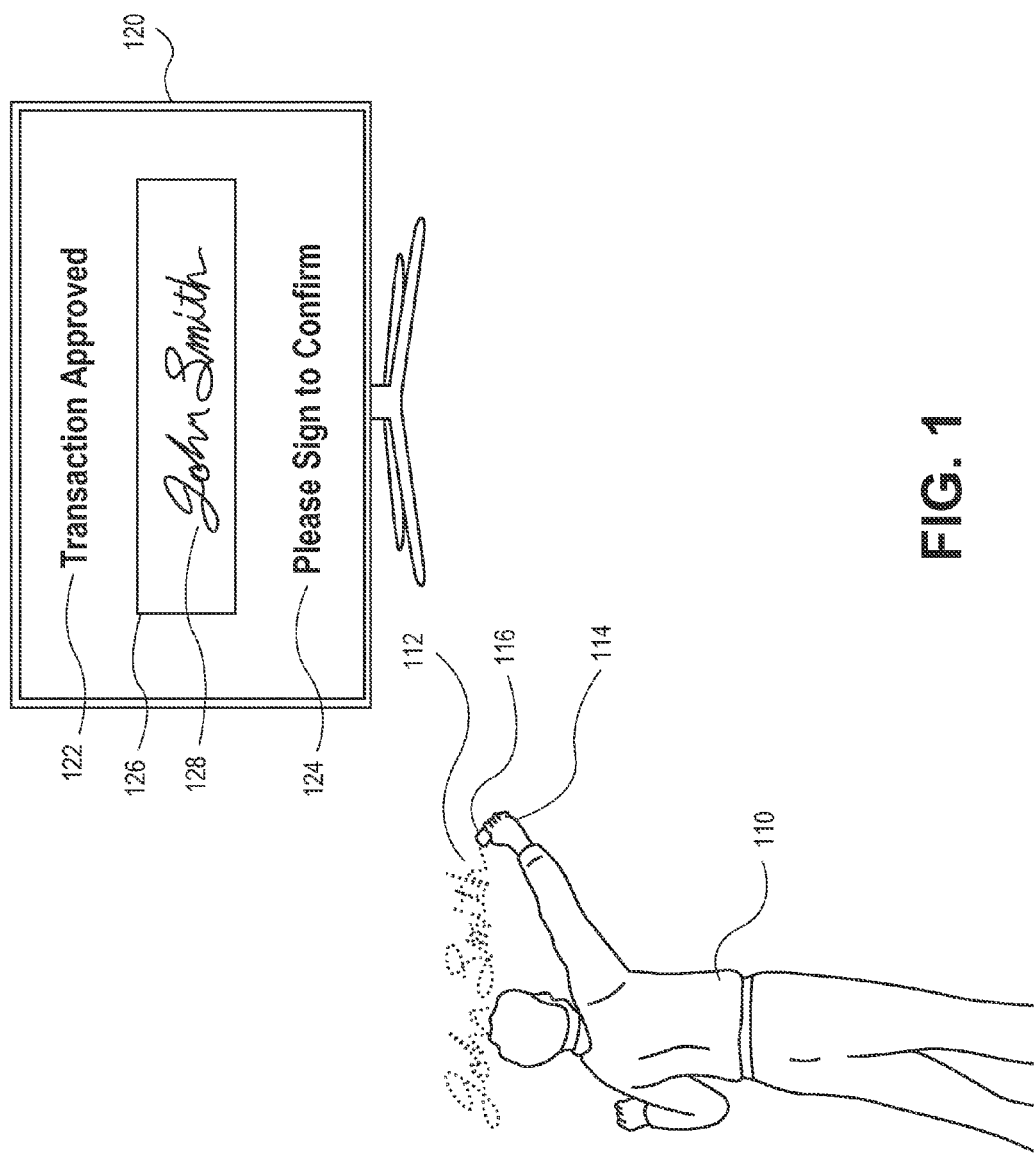
FIG. 1 is a diagram illustrating a use case of signature capture according to an embodiment of the present invention.

Consumers may use payment accounts to conduct financial transactions. Payment accounts may be associated with portable consumer devices (e.g., as credit cards, debit cards, smart cards, mobile devices, mobile phones, keychain fobs, personal digital assistant (PDAs), payment chip, and the like). In a point of sale environment, the merchant can request that the consumer sign a paper receipt or otherwise provide a signature (e.g., using a signature pad on a point of sale device) for cardholder verification of the transaction. The signature can be used for non-repudiation purposes. Providing a signature is accepted by the typical consumer and is generally not considered overly invasive or burdensome for the consumer to provide.

Consumers are increasingly conducting financial transaction using the Internet, where the merchant cannot conveniently request the consumer's handwritten signature to verify the transaction. For example, many consumers use internet-connected televisions (sometimes referred to as a "smart TV") or other computing devices to conduct financial transactions. Although a consumer's payment account information (and in some cases even a password or personal identifier) may be used to conduct a transaction using a smart TV, there is typically no requirement for an indication that the person conducting the transaction is the actual owner of the payment account being used for the transaction (i.e., there is no mechanism to verify the identity of the person conducting the transaction). This problem arises because a consumer's payment account can be used by anyone in possession of the payment account data, or anyone in possession of the portable consumer device with the payment account data on it. For example, some smart cards (or other form of "chip" cards) may include data corresponding to the password or personal identifier, so that anyone in possession of the card (and able to read the data from it) can use the card to conduct a transaction.

In the e-commerce context, it would be burdensome and unrealistic for a consumer to sign a paper receipt and return it to the merchant. Furthermore, consumers typically do not have a dedicated point of sale device with a signature pad. Therefore, there is a need for capturing consumer signatures for non-repudiation purposes for transactions where the merchant and the consumer are not collocated. Additionally, many smart TV and other computing devices do not have touch screen capabilities, meaning that a touch interface may not be available for use by the consumer to provide a signature. Touch interfaces on large displays often associated with smart TVs can be prohibitively expensive. Therefore, there is a need for capturing signatures using hardware components that are more conventionally associated with a TV (e.g., a remote control, set-top box, TV peripheral, etc.) and/or hardware components that are in wide use (e.g., mobile phones, PDAs, etc.).

Certain embodiments of the invention are directed to systems, apparatuses and methods for performing payment transactions using internet-connected devices, such as a smart TV, and confirming the transaction with a signature. In one embodiment, a representation of the consumer's signature is captured and processed for cardholder verification of a transaction. The representation of the consumer's signature can provide a non-repudiation mechanism similar in function to that of a consumer's handwritten signature on a credit card or debit card receipt. Therefore, cardholder verification provides additional security for both the issuer and the consumer.

FIG. 1 illustrates a consumer verification stage of a transaction according to an embodiment of the invention. In one embodiment, consumer 110 uses a smart TV 120 to conduct a financial transaction.

At the point illustrated, consumer 110 may have already selected items to purchase, provided payment account information, and initiated the transaction. In one embodiment, an issuer or payment processing network approves the transaction and an indication 122 of the approval status is displayed on smart TV 120. To confirm the transaction, smart TV 120 can display a prompt 124 to the user. For example, the smart TV can display "Please Sign to Confirm" on the display.

Using a motion sensor, consumer's signature may be captured. In one embodiment, consumer 110 can move his arm/hand in a manner that resembles his signature during a signature capture phase. For example, consumer 110 can "wave" a signature in the air or otherwise perform a signature gesture that simulates the consumer's signature. In some embodiments, the signature gesture 112 may be detected by one or more sensors in the smart TV and/or a remote control device. In some embodiments, signature gesture 112 made by consumer's hand 114 may be captured and processed by smart TV 120 and/or remote control device 116. In some embodiments, the signature gesture 112 made by consumer's hand 114 may be captured and processed by smart TV 120 without the use of a remote control (e.g., using camera or other motion sensor). That is, the smart TV or the remote control (or both) may function a signature capture device.

A "signature gesture" may be a movement of the consumer in a fashion that represents his or her signature. Typically, a signature gesture is made with one or more of the consumer's body and/or limbs, for example, by "tracing" a signature in the air. In some embodiments, a signature gesture can be made by the consumer without using a handheld device. In some embodiments, a signature gesture can be made by the consumer with a handheld device (e.g., a signature capture device such as a remote controller) in his or her hand. Signature gestures can be captured by one or more computing devices and interpreted using gesture recognition technology.

Regardless of how the motion of the consumer's signature is captured, an electronic representation of the signature is generated from the motion data signals sensed by the motion sensor. In one embodiment, the electronic signature representation may be graphical (e.g., an image). In one embodiment, the electronic signature representation may be displayed on the smart TV (e.g., signature image 128 may be displayed on smart TV 120 in signature field 126). In one embodiment, the electronic signature representation is converted to a code (e.g., an alpha numeric code) such that it can be transmitted as part of a transaction message (e.g., an authorization message or transaction confirmation message). In one embodiment, the code may be converted into a graphical form. In one embodiment, the graphical form may be converted to a code form. In one embodiment, the electronic signature representation may be stored on the smart TV or the remote control device. In one embodiment, the electronic signature representation may be transmitted to a financial institution (e.g., an issuer or an acquirer), or the like. For example, the representation of the consumer's signature may be inserted into an appropriate data field in a transaction approval form to provide a non-repudiation mechanism for the transaction.

Systems for Signature Capture

Figure 2:
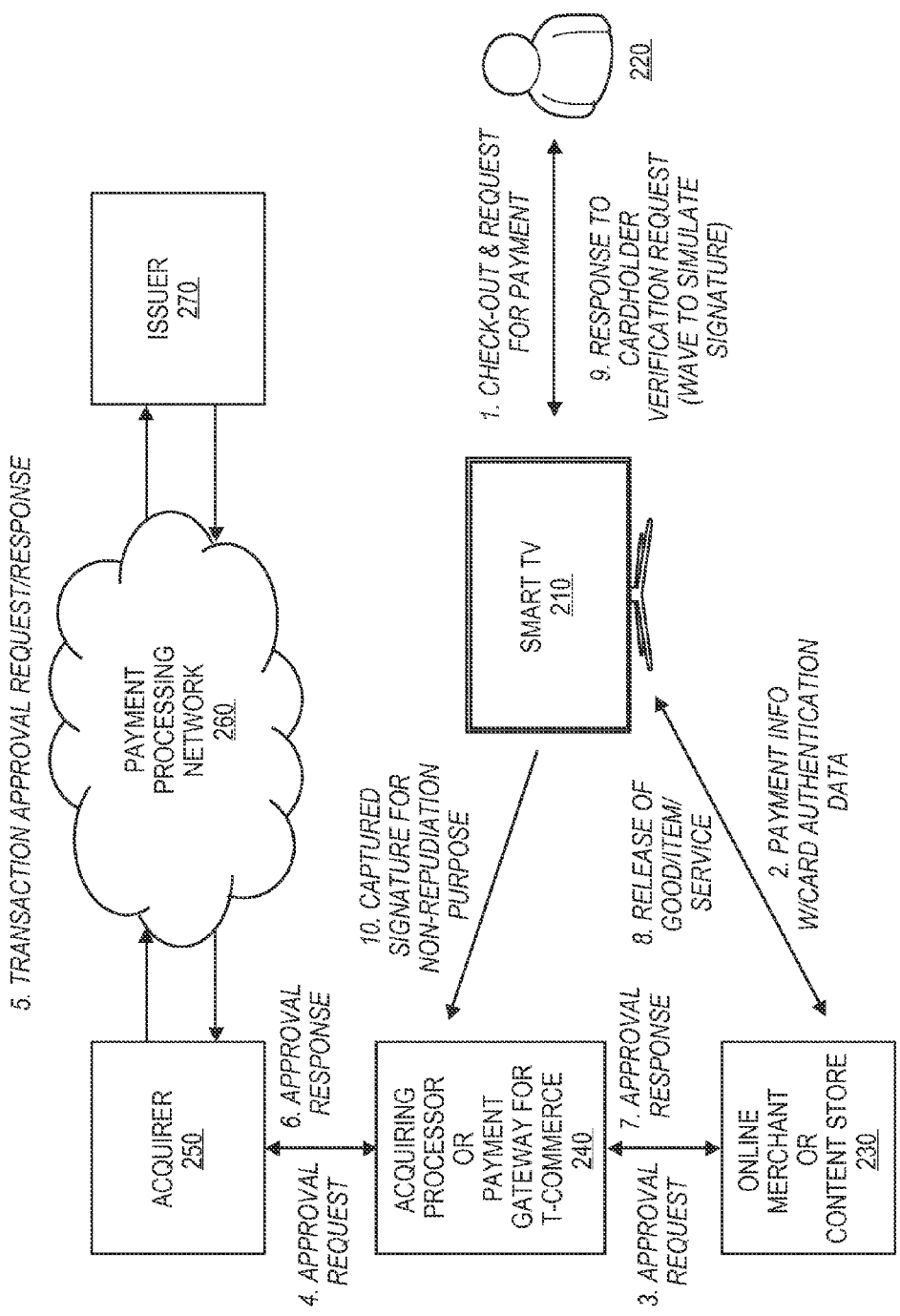
FIG. 2 is a block diagram of an example of an operating environment in which embodiments of the invention can be implemented.

FIG. 2 is a block diagram of an example operating environment 200 in which embodiments of the invention can be implemented, including a depiction of some of the elements and operations that may be used to conduct a payment transaction using a smart TV 210 or similar device.

A smart TV device can refer to a television set with integrated Internet capabilities or a set-top box for television that offers more advanced computing ability and connectivity than a conventional television set. Smart TV 120 or similar advanced devices (e.g., internet-connected televisions), set top boxes, consoles, etc. can combine content presentation and internet access. In some embodiments, smart TVs or similar advanced devices can include a television tuner for over-the-air access, a coaxial input for cable television, and/or other audio-video inputs. In some embodiments, smart TVs or similar advanced devices can include large display screens (e.g., 40 inches or more). Although the disclosure herein focuses on smart TVs, one having skill in the art will appreciate that the signature capture methods can apply to other connected computing devices. For example, the signature capture method could be used in an internet transaction using a web browser or a mobile transaction using a mobile device.

As shown in FIG. 2, smart TV 210 may be used by a consumer 220 to display items that the consumer may purchase. Such items may include products, services, applications, content, or other suitable items. The items may be displayed on a screen of smart TV 210 by the operation of a client module. The client module may generate the screen display by accessing data stored in smart TV 210, accessing data from a remote server over an Internet connection, or another suitable source. For example, the consumer may select items/services offered by an online merchant or content store 230. The consumer may be enabled to navigate the displayed items and to select a desired item for purchase using an input device (e.g., a remote control device, a keypad, data input elements of the TV, a mobile device or phone, etc.).

After the desired item is selected, the client module may communicate with a server to request that the item be purchased from an online merchant or a content store 230. The request can include a transaction identifier and other information describing the transaction. The server may respond by generating a response to the order request, with the response including a payment identifier. The payment identifier allows the order information to be associated with the payment method being used by the consumer.

The payment identifier may then be provided to a payment module, which can be an application installed in the smart TV that is used to initiate a payment transaction process. The payment module may then request the consumer to provide information about the payment account that should be used to provide payment for the purchase. This may take the form of a request displayed to the consumer on the smart TV or on a display screen of the remote controller. Information about the payment account to be used in the transaction can be received in a number of ways, some of which are described with reference to FIG. 8 below.

After the payment module receives the payment account information, it can generate a payment transaction authorization request (identified as "Approval Request" in the figure). In one embodiment, the payment transaction authorization request may include the payment account information (e.g., the payment account number or identifier). In one embodiment, the payment transaction authorization request may include the payment identifier (the payment ID). The transaction authorization request may contain other suitable data.

The payment transaction authorization request can be provided to an acquirer 250. Acquirer 250 can be a bank or institution that manages the purchase transactions for the online merchant or content store 230 for the item(s) being purchased by the consumer. The payment authorization request may be provided to acquirer through an acquiring processor or payment gateway (240).

Acquirer 240 processes the request and provides it (along with other information if needed) to a payment processing network 260. The payment processing network may be operated by a payment processing organization, such as Visa, and may include data processing subsystems, networks, and operations used to support and deliver authorization services, exception file services, and clearing and settlement services. An example payment processing system may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network may include a server computer. A server computer is typically a powerful computer or cluster of computers. For example, the server computer can be a large mainframe, a minicomputer cluster, or a group of server computers functioning as a unit. In one example, the server computer may be a database server computer coupled to a Web server computer. Payment processing network 260 may use any suitable wired or wireless network, including the Internet.

The payment processing network processes the request and may determine if the transaction appears fraudulent, and if not, if it should be approved or denied. After processing the request, the payment processing network provides the request to an issuer 270 of the payment account. Issuer 270 is typically a bank or institution that provided the payment device to the consumer and manages their payment account.

Issuer 270 can process the request and determines if the transaction should be approved or denied. The approval or denial can be contained in a response that is provided to payment processing network 260 and from there to acquirer 250. Then, the response can be provided to the server, which provides the response to the client module in smart TV 210. If the transaction is approved, then the client module may display an approval form to the consumer on a display screen of smart TV 210. The approval form may contain a space, data field, location, text box, etc. into which the consumer may enter their signature to serve as a non-repudiation mechanism for the transaction.

After the consumer signature is received, the representation of the consumer's signature can be inserted into the appropriate location in the displayed form. In one embodiment, the signature can be provided to the server of an acquiring processor/payment gateway 240, the acquirer 250, or any other suitable recording keeping server or entity. In some embodiments, the signature can be stored on smart TV 210 and/or remote control (not shown). This typically completes the consumer's approval of the transaction and provides a record of their acceptance of the terms of the transaction.

Methods for Signature Capture

Figure 3:
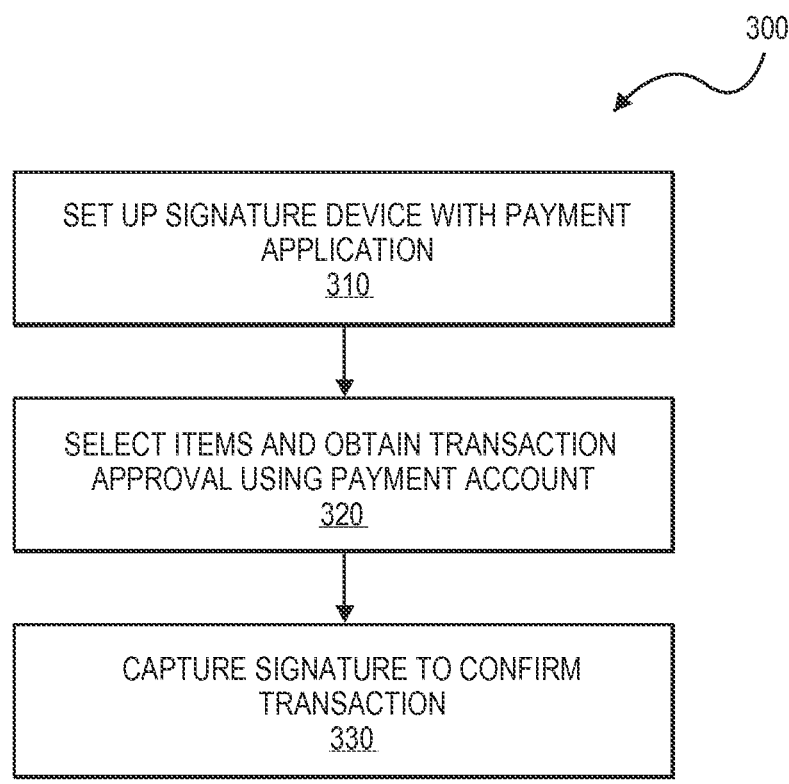
FIG. 3 illustrates a method according to an embodiment of the invention.

FIG. 3 shows a high-level method 300 for registering a signature device, conducting a transaction, and capturing a signature. In one embodiment, method 300 includes the step (block 310) of setting up a signature device with a payment application on a computing device. The signature device is a device used by the consumer to provide a signature (e.g., remote control, PDA, mobile phone, etc.). A signature device is typically a handheld device that a consumer can hold while making a signature gesture. Setting up the signature device with the payment application can initialize the signature device for use as a non-repudiation mechanism. In some embodiments, the computing device used to select/buy items and the signature device may be embodied in a single device. The step of setting up the signature device is described further with reference to FIG. 4.

In one embodiment, method 300 includes the step (block 320) of selecting goods and/or services to purchase with a computing device and obtaining a transaction approval using a payment account. In this step, the consumer can use an internet-connected computing device, such as a smart TV, to select items for purchase. A remote control or other user input device may be used to navigate various user interfaces displayed on the smart TV and select goods or services to purchase. A transaction request can be generated and transmitted, and an authorization can be received. The step of conducting a transaction and obtaining a transaction approval using payment account is described further with reference to FIG. 5.

In one embodiment, method 300 includes the step (block 330) of capturing a signature to confirm the transaction. In one embodiment, the signature is captured by a signature capture device. In one embodiment, the signature is captured by an internet-connected computing device. The step of capturing a signature to confirm the transaction is described further with reference to FIG. 6.

Figure 4:
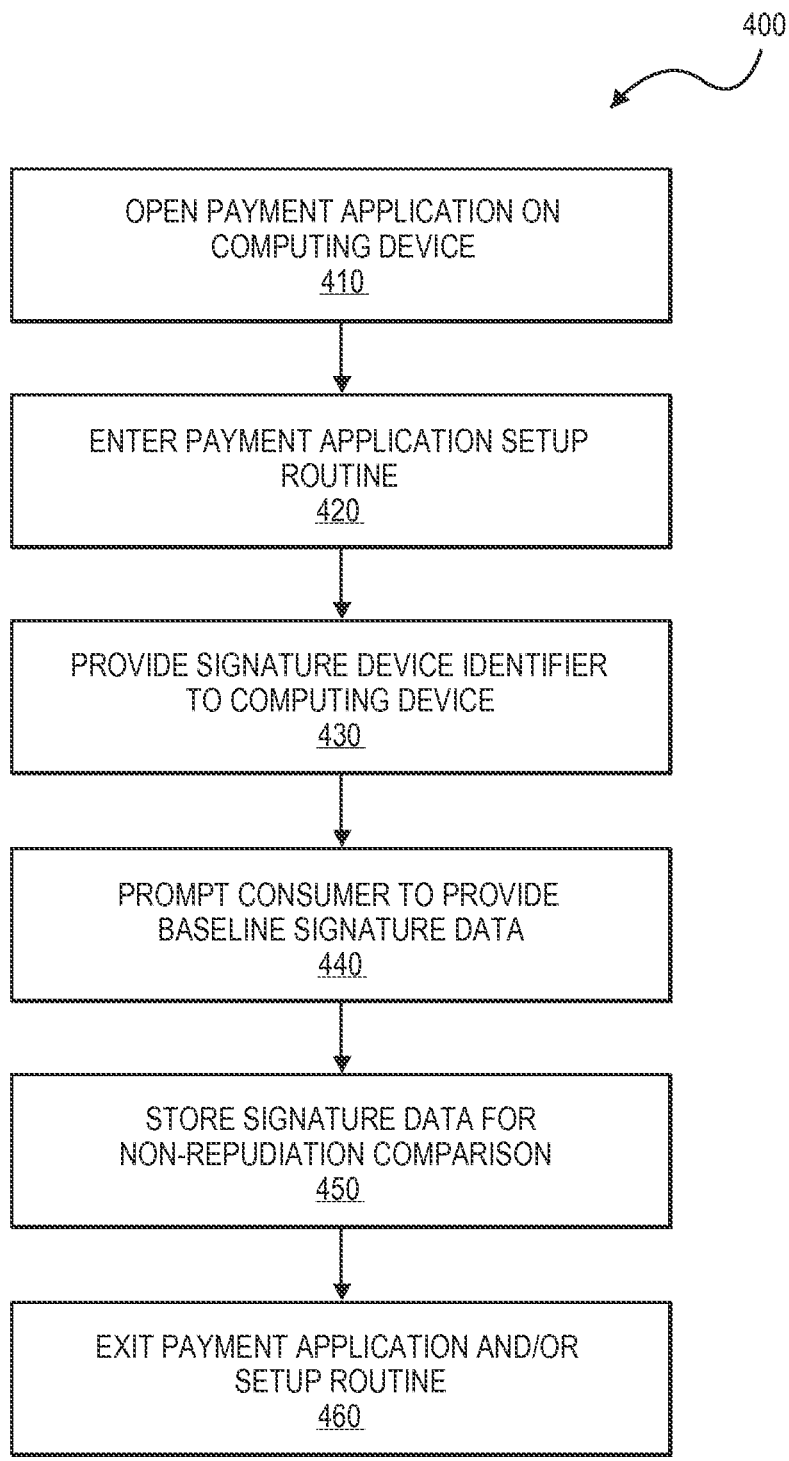
FIG. 4 illustrates a method of registering a non-repudiation device according to an embodiment of the invention.

As described above, in some embodiments, a signature device can be used to provide a signature to confirm a transaction. FIG. 4 illustrates a method 400 where a signature device is used to provide a signature for non-repudiation according to some embodiments. At block 410, a consumer can open a payment application on the computing device. The payment application may be associated with a financial institution, a merchant, a payment processor, or any suitable entity. The payment application can be used to initiated and complete a payment transaction.

At block 420, a consumer can enter a setup routine for the payment application. The set up routine can be used to customize settings and configurations for the payment application. In one embodiment, payment account information (e.g., PAN, expiration, etc.) may be entered in the payment application setup routine. In one embodiment, other consumer information such as billing address, shipping addresses, usernames, passwords, etc., can be entered, initialized, or modified using the setup routine.

At block 430, an identifier for the signature device can be provided to the computing device (e.g., a hardware identifier). For example, a unique identifier for a remote control can be provided to the smart TV. The signature devices (e.g., remote control) and the computing device (e.g., Smart TV) may communicate using any suitable technology, including Bluetooth, WiFi, infrared, NFC, etc. The payment application may associate the signature device identifier with other information, including user/consumer data, payment account data, etc.

In some embodiments, a remote control device may also serve as a security token for a particular user. Security tokens can provide an additional factor in the multi-factor authentication solutions. A security token (e.g., hardware token, authentication token, USB token, cryptographic token, or key fob) can be a physical device that an authorized user is given for authentication. In some embodiments, the security token may store cryptographic keys, digital signatures, or biometric data, and the like.

For example, in one embodiment, a particular signature device may be useable only when a particular user is logged into the smart TV and/or payment application. In another example, a particular signature device may only be useable in connection with transactions using a specific payment account. These examples are illustrative only, and one having skill in the art will recognize that other implementations are possible without departing from the scope of the disclosure.

In one embodiment, the step of providing the signature device identifier may occur transparently to the user. In one embodiment, the user may manually enter an identifier for the signature device, a pairing code, or the like. In some embodiments, the computing device and the signature device are embodied in the same device and this step may be omitted.

At block 440, the consumer is prompted to provide signature data. The signature data captured in the setup routine may be referred to as baseline signature data that is used for comparison purposes. For example, baseline signature data may be thought of as the digital equivalent of signing the back of a credit card so that a merchant can compare the signature on a sales receipt.

In some embodiments, the consumer provides his or her signature, and the computing device and/or the signature device captures the baseline signature data. In some embodiments, the consumer may provide a user input to indicate to the system that they are providing their signature and/or have finished providing their signature. In some embodiments, the system may instruct the user when to provide their signature. In some embodiments, the consumer can review the captured baseline signature data, accept the signature, and/or provide a new signature.

At block 450, the signature data can be stored for non-repudiation comparison during a transaction. The signature data can be stored on the computing device, signature device, and/or a remote server (e.g., a remote server associated with a payment service or financial institution). The stored signature data may later be accessed during a transaction and compared to signature data captured as part of a transaction. If the stored signature data and the transaction signature data match or are within a predetermined match threshold, the transaction can be considered confirmed. Any suitable handwriting or image recognition software module may be used.

At block 460, the user can exit the payment application and/or the setup routine. This completes the setup process. In one embodiment, after the setup process is complete, items may be selected for purchase and transactions can be conducted, etc.

Figure 5:
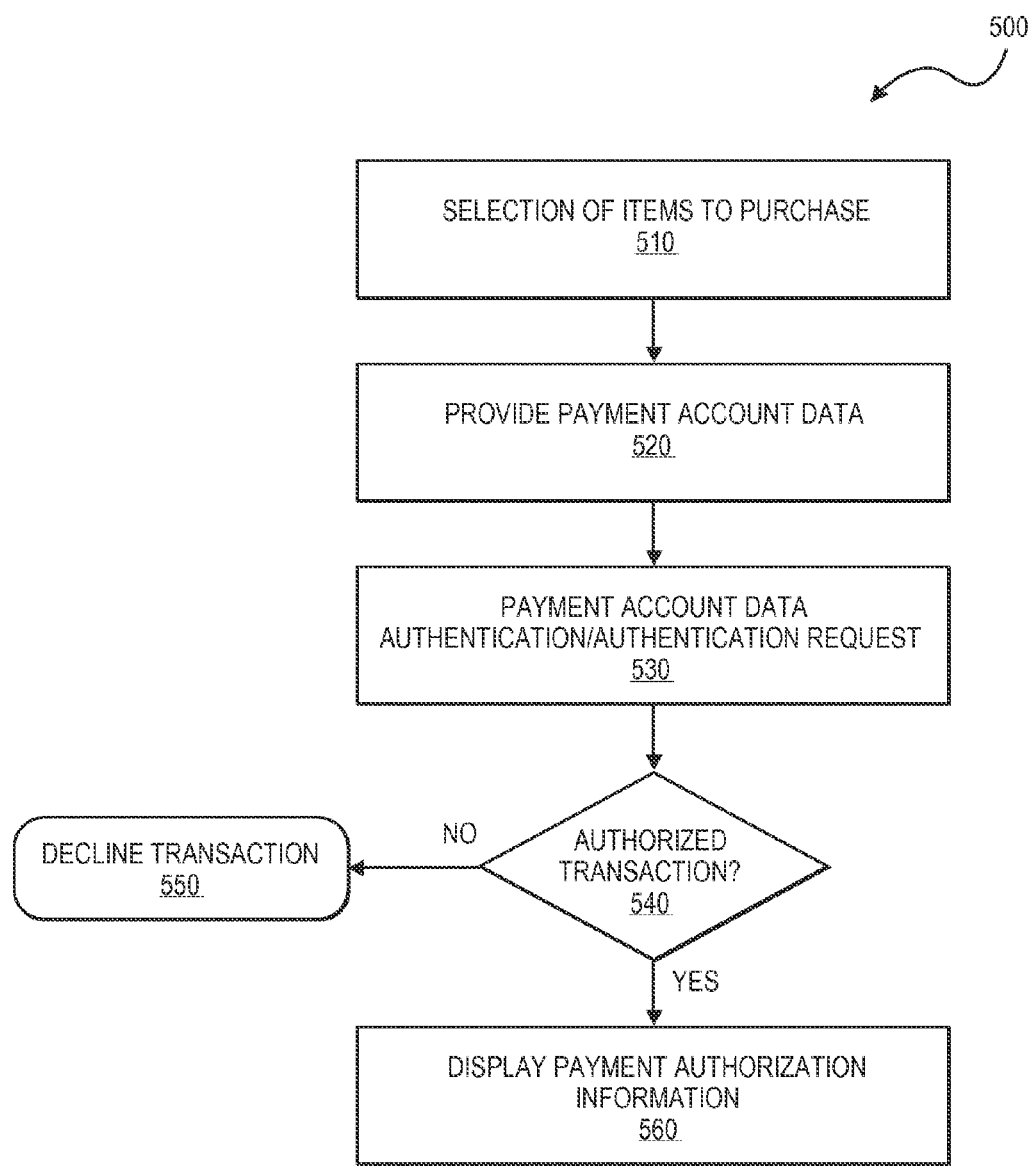
FIG. 5 illustrates a method of initiating a transaction according to an embodiment of the invention.
Figure 9A:
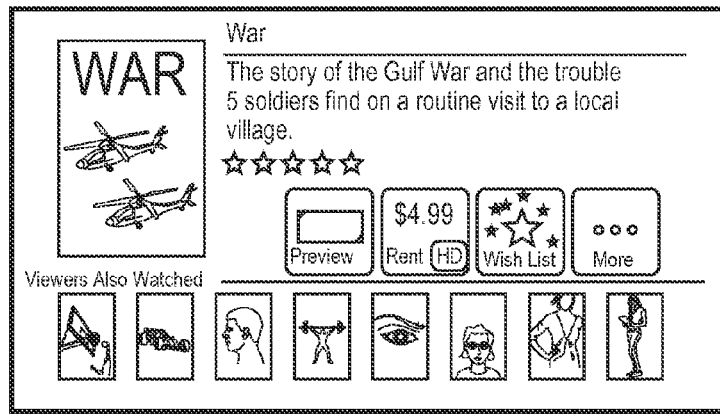
FIGS. 9A and 9B are diagrams illustrating certain of the operations involved in conducting a payment transaction and user interface displays that may be used in the performance of those operations.
Figure 9A:
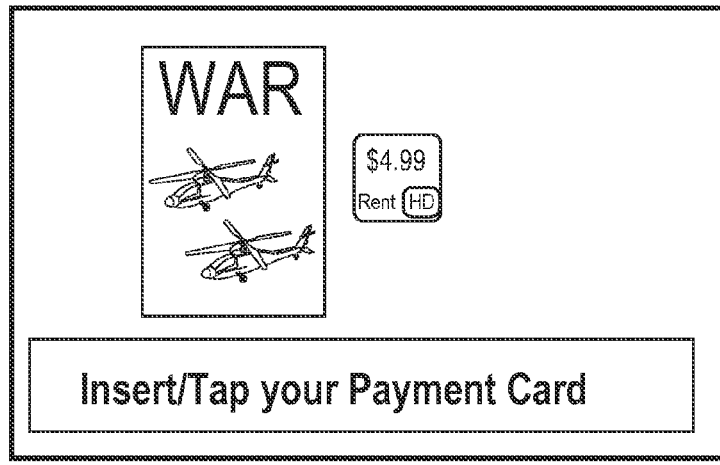
Figure 9A:
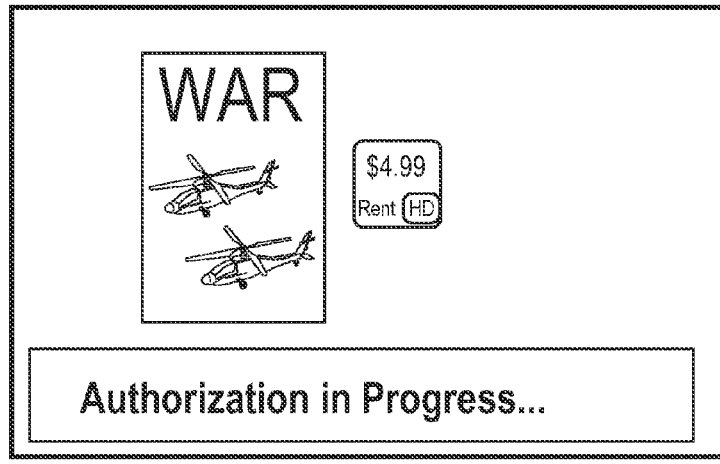

FIG. 5 illustrates a method 500 for selecting items for purchase and initiating a transaction according to some embodiments of the invention. At block 510, a consumer can select items (e.g., goods or services) to purchase using a smart TV. An embodiment for selecting goods or services to purchase is illustrated in FIG. 9A. The selected items may be associated with item information, e.g., identifiers, product codes, descriptions, and the like.

At block 520, payment account data can be provided to the smart TV and/or a payment server. The payment account data can be provided in a number of ways, including manual entry by the consumer (PAN, Expiration, CVV, etc.) or using a card reader (e.g., integrated in the smart TV, remote control, etc.). In one embodiment, the payment account data may be stored securely in the cloud (e.g., maintained by a server for the payment application or any other suitable server). Certain embodiments including payment account or card readers are described with reference to FIG. 8.

At block 530, payment account data can be authenticated and an authorization request message can be generated. In one embodiment, a payment server authenticates the payment account data. In one embodiment, the smart TV authenticates the payment account data. In one embodiment, the authorization request is generated by the smart TV (e.g., an application running on the smart TV). In one embodiment, the authorization request is generated by a payment server (e.g., by a third party server based on payment account data provided by the payment application running on the smart TV).

At block 540, a decision regarding whether or not the transaction is authorized can be made (or received). In one embodiment, one or more of an acquirer, payment processing network, or an issuer may approve or deny the transaction. Transactions may be approved/denied for a number of reasons including fraud scores, funds availability, etc. The status (approval or denial) of the transaction may be transmitted in an authorization request response message, or authorization response message, to the application on the smart TV.

If the transaction is not approved, the transaction is declined (block 550). If the transaction is approved, payment authorization information may be displayed on the smart TV (block 560). After the approval of the transaction, the consumer can be asked to verify the transaction for non-repudiation purposes.

Figure 6:
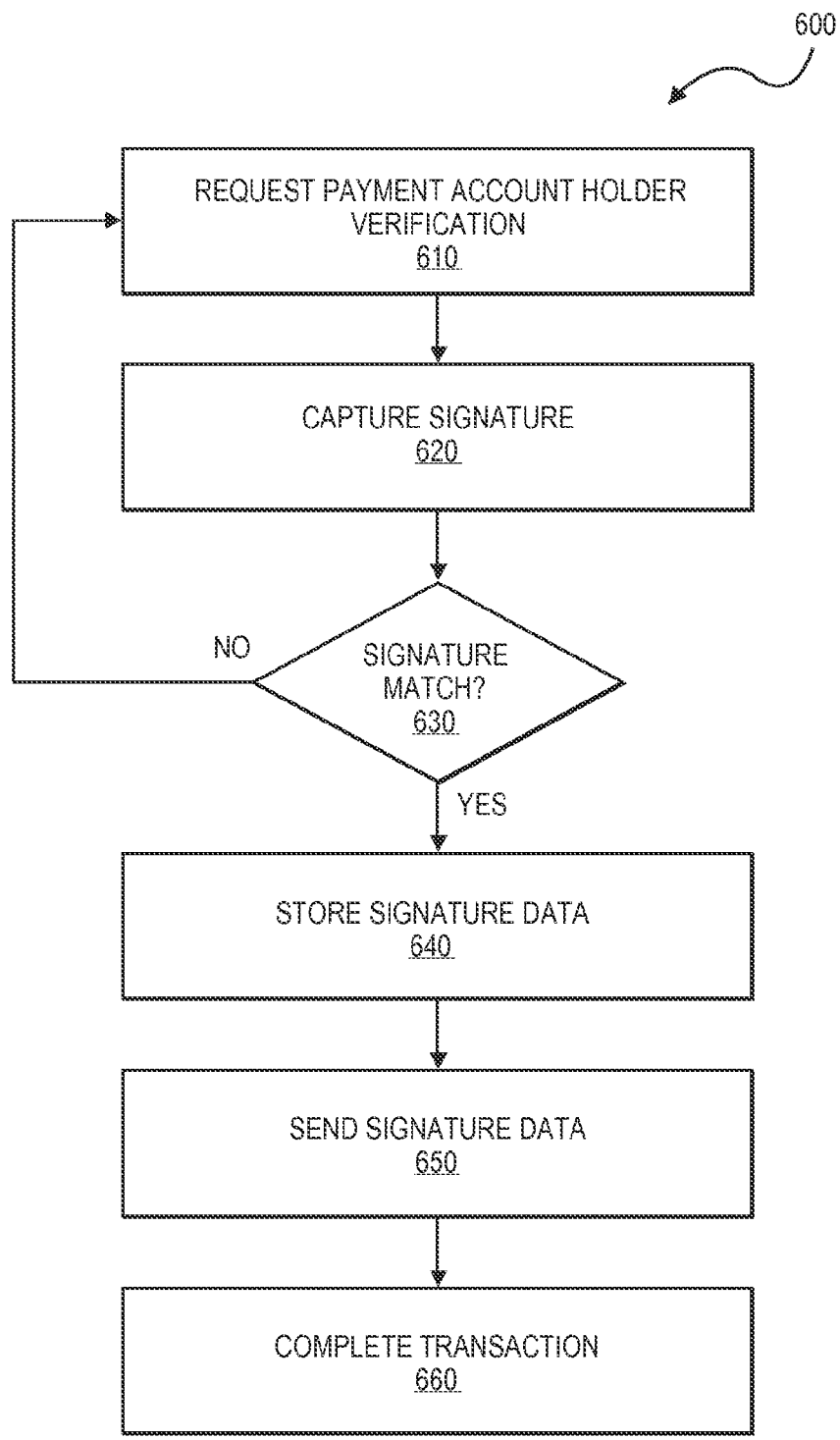
FIG. 6 illustrates a method of account holder verification according to an embodiment of the invention.

FIG. 6 illustrates a method 600 for payment account holder verification according to some embodiments of the invention. At block 610, an application on the smart TV may request payment account holder verification. For example, the application can prompt the consumer to provide a signature, much like the consumer would provide at the point of sale.

At block 620, the signature of the consumer is captured. In some embodiments, the smart TV captures the signature. In some embodiments, a signature capture device senses the movement of the consumer's signature. In some embodiments, a combination of the smart TV and a signature capture device senses the movement of the consumer's signature. In one embodiment, a remote control comprises a touch-sensitive surface that is used instead of a motion sensor for capturing the signature. The signature can be captured using the touchpad and displayed on the smart TV, for example.

At block 630, the signature captured (in step 620) may be compared to stored signature data (e.g., stored in step 450 in FIG. 4). In one embodiment, handwriting recognition or other image/signature analysis can be used to compare the signature captured as part of the transaction to the signature "on file" for that consumer. The stored signature may be stored in the cloud, on the smart TV, or in another suitable memory location. In some embodiments, based on the analysis of the signatures, if it is determined that the captured signature matches the stored signature, the process continues to block 640. In some embodiments, based on the analysis of the signatures, if it is determined that the captured signature does not match the stored signature, the process can return to step 610 (e.g., to request payment account holder verification again). In one embodiment, the process can end after a predetermined number of failed verifications (e.g., 3 or 5 failed signature attempts). In this circumstance, the transaction can be denied due to lack of non-repudiation data.

In some embodiments, the remote control may be used as a security token such that a transaction is not to be confirmed unless the security token is verified. For example, in one embodiment, captured signature data will not be deemed to match stored signature data unless the signature data was captured with a particular remote control. In some embodiments, if the consumer uses an unrecognized signature device to confirm a transaction, the transaction can be denied. In some embodiments, if a recognized signature device is used to provide a valid signature, the transaction can be confirmed. In some embodiments, the signature data is stored on the computing device and/or the signature device.

In some embodiments, the captured signature may be stored (640). For example, the signature may be stored for non-repudiation purposes. In some embodiment, the signature data is stored as an image file. In some embodiments, the signature data is stored as an alphanumeric code.

In some embodiments, the signature data may be sent to a payment server (650) for non-repudiation. The signature data may be stored locally and/or in the cloud. In some embodiments, the signature data is associated with the transaction (e.g., to a transaction ID, an authorization message, etc.) so that it can later be referenced for non-repudiation purposes. At block 660, the payment transaction may be considered complete (e.g., merchant can ship merchandise, provide service, start content download, etc.). In some embodiments, a confirmation message can be displayed on the smart TV. In some embodiments, a confirmation message can be sent to the consumer (e.g., an email, text message, app alert, etc.). In some embodiments, an image of the signature is included in the confirmation message.

Signature Capture System

Figure 7:
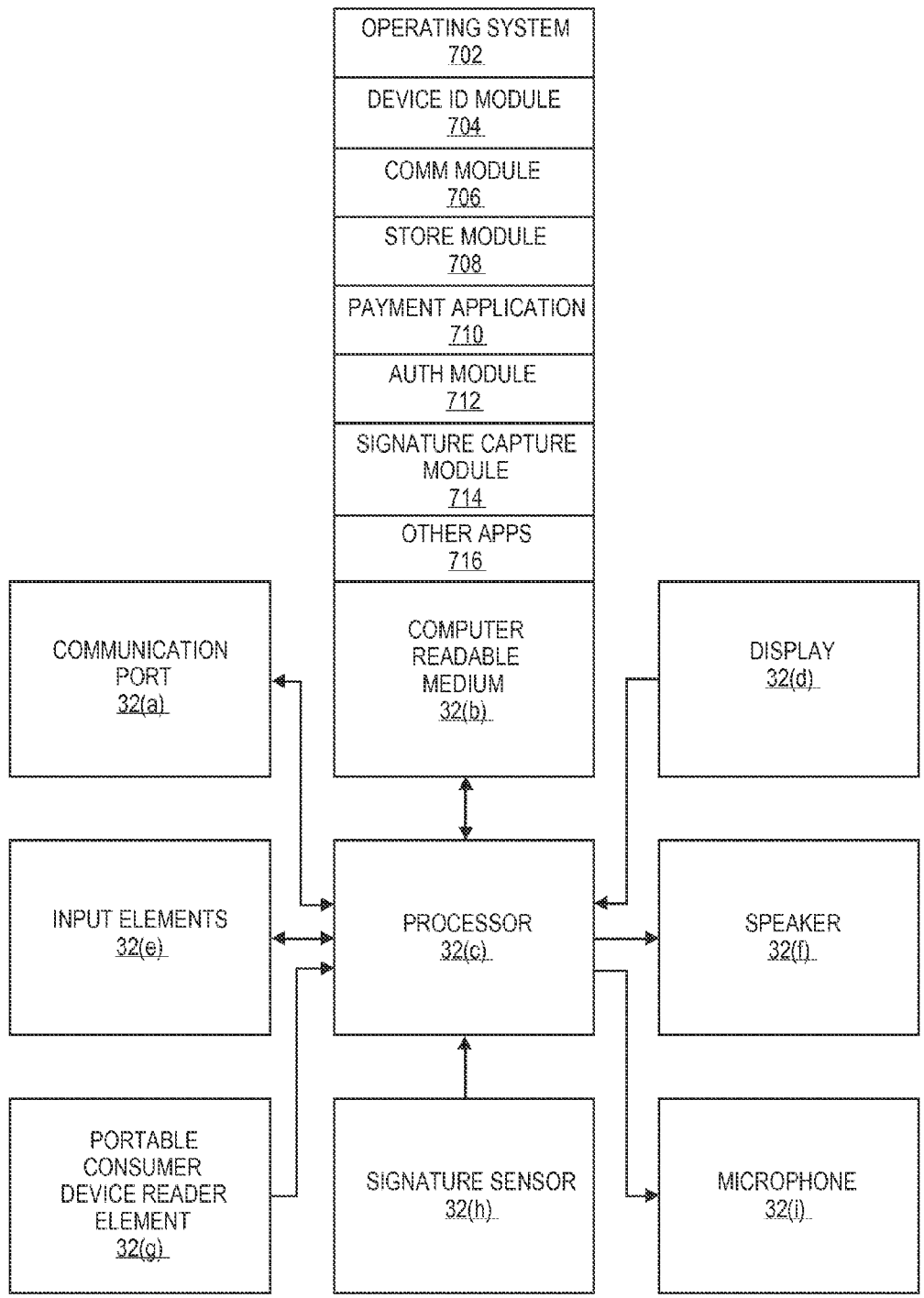
FIG. 7 is a block diagram of a device according to an embodiment of the invention.

FIG. 7 illustrates a system that can be used to capture a consumer's signature according to some embodiments of the invention. System 32 can be embodied in a smart TV (e.g., 120 in FIG. 1) or a signature capture device (e.g., remote control device 116 in FIG. 1) or some combination thereof. It is appreciated that one or more elements may be included or omitted depending on the particular application. System 32 includes elements that may be connected by a bus, although it is understood that certain elements may be embodied in one device and other elements in another device in certain embodiments. For example, in one embodiment, the signature sensor may be part of the remote control. In one embodiment, the signature sensor may be part of the smart TV. In one embodiment, a remote control may not be used to capture the signature at all.

System 32 may include a processor 32(c) (e.g., a microprocessor) for processing the functions of system 32 and a display 32(d) coupled to the processor. System 32 may further include input elements 32(e) to allow a user to input information into the device, a speaker 32(f), and a microphone 32(i). System 32 may also include a communication port 32(a) for wired or wireless data transfer (e.g., data transmission), such as a physical port or an antenna.

The computer-readable medium 32(b) may be present within the body of the smart TV and/or remote control or may be detachable from it. The body may be in the form a housing or other structure. The computer-readable medium 32(b) may be a memory that stores data. One or more processors 32(c) can run various software components stored in medium 32(b) to perform various functions for system 32.

In some embodiments, the software components (or sets of instructions) include an operating system 702. In some embodiments, the software components include a device identification module 704 for storing and/or processing device identification information (e.g., hardware ID). In some embodiments, the software components include a communication module 706, which can facilitate communication with other devices using communication port 32(a) or similar port (e.g., Bluetooth, WiFi, infrared, NFC, and other wireless communication technology). In some embodiments, the software components include a store application 708, which can be used to access an online merchant or content store (e.g., 230 in FIG. 2). In some embodiments, the software components include a payment application 710, which may be a client-side application for facilitating payment. Payment application 710 may be a part of store application 708 or another suitable application. In some embodiments, the software components include an authentication module 712, for authenticating payment account information, consumer information, etc.

In some embodiments, the software components include a signature capture module 714, which may interpret signals received from sensor(s) 32(h). Signature capture module 714 may generate and store signature data representative of the captured signature. Signature capture module 714 may include gesture recognition and/or handwriting recognition sub-modules for capturing the signature gesture and comparing the captured signature data to the stored signature data. Signature capture module 714 may convert motion sensor data to an image file or other data representation of the consumer's signature. There may be other modules or sets of instructions (e.g., other applications/modules 716). It is appreciated that the signature capture module can be included on the computing device (or a peripheral device connected to the computing device) or the signature capture device.

System 32 may further include a portable consumer device reader element 32(g). Portable consumer device reader element 32(g) may comprise a magnetic stripe reader, contactless reader, smart card reader, or the like. Portable consumer device reader element 32(g) may be capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth, infrared, or other data transfer capability that can be used to exchange data between the system 32 and an interrogation device. Thus, system 32 is capable of communicating and transferring data and/or control instructions via both a cellular network and a near field communications line or network. System 32 may be implemented in the form of a semiconductor chip (or other data storage element) with an associated wireless transfer (e.g., data transmission) element, such as an antenna. It is appreciated that portable consumer device reader can be included on the computing device (or a peripheral device connected to the computing device) or the signature capture device.

Signature sensor 32(h) can be any suitable motion or positioning sensor, including an accelerometers, gyroscope, infrared sensor, camera, etc. Signature sensor 32(h) can detect the movement as the consumer "traces" his or her signature. The signature sensor can be part of the computing device and/or the signature device. Referring back to FIG. 1, the motion sensor (or motion sensing system) can be included in the smart TV 120, a remote control device 116, or a combination thereof.

In some embodiments, a remote control 116 (FIG. 1) includes a motion sensor (e.g., 32(h) in FIG. 7) and the remote control may be used to provide a representation of the consumer's signature for purposes of approving the transaction. For example, a remote control may have a motion sensor and consumer 110 may move the remote control in his hand during the signature capture phase and the remote control detects its own movement (e.g., an accelerometer in the remote control). In some embodiments, the motion of a remote control or similar device may be detected by a sensor on the smart TV or on an input device attached to the smart TV.

In one embodiment, smart TV 120 may have a sensor (e.g., 32(b) in FIG. 7) for detecting the movement of a remote control, where the movement resembles the consumer's signature. In one embodiment, the sensor may detect the motion of a source of light (or other form of emitter) on the remote control. For example, the remote controller may include a light or infrared emitter that moves as the consumer moves the controller. The motion of the light may be detected by a sensor that is integrated with the smart TV (or that is part of a separate unit which is connected to the smart TV). In some embodiments, the remote control and motion sensing elements in the smart TV will be implemented by the same manufacturer in order to provide compatibility with each other. If the controller includes some form of infrared emitter, then the signal produced by the emitter may be detected by the sensor and its variations converted into a representation of the consumer's signature. In addition to or instead of the output of a light or emitter, the sensor may detect the motion of the consumer's hand or arm and operate to convert that into a representation of the consumer's signature.

In some embodiments, smart TV 120 includes a motion sensor and a remote control device not used for signature purposes. In one embodiment, smart TV 120 may have a motion sensor (e.g., 32(*h*) from FIG. 7) for detecting the movement of the consumer's arm or hand in a manner resembling the consumer's signature. The sensor, for example, could be a video camera coupled motion detection software running on the smart TV. In some embodiments, the detecting of the movement of the consumer's arm or hand in a manner resembling the consumer's signature may be detected by a device attached to the smart TV (e.g., set-top box or peripheral device).

Regardless of how the motion is captured, the motion sensor signal can be processed and converted into a representation of the consumer's signature.

Figure 8:
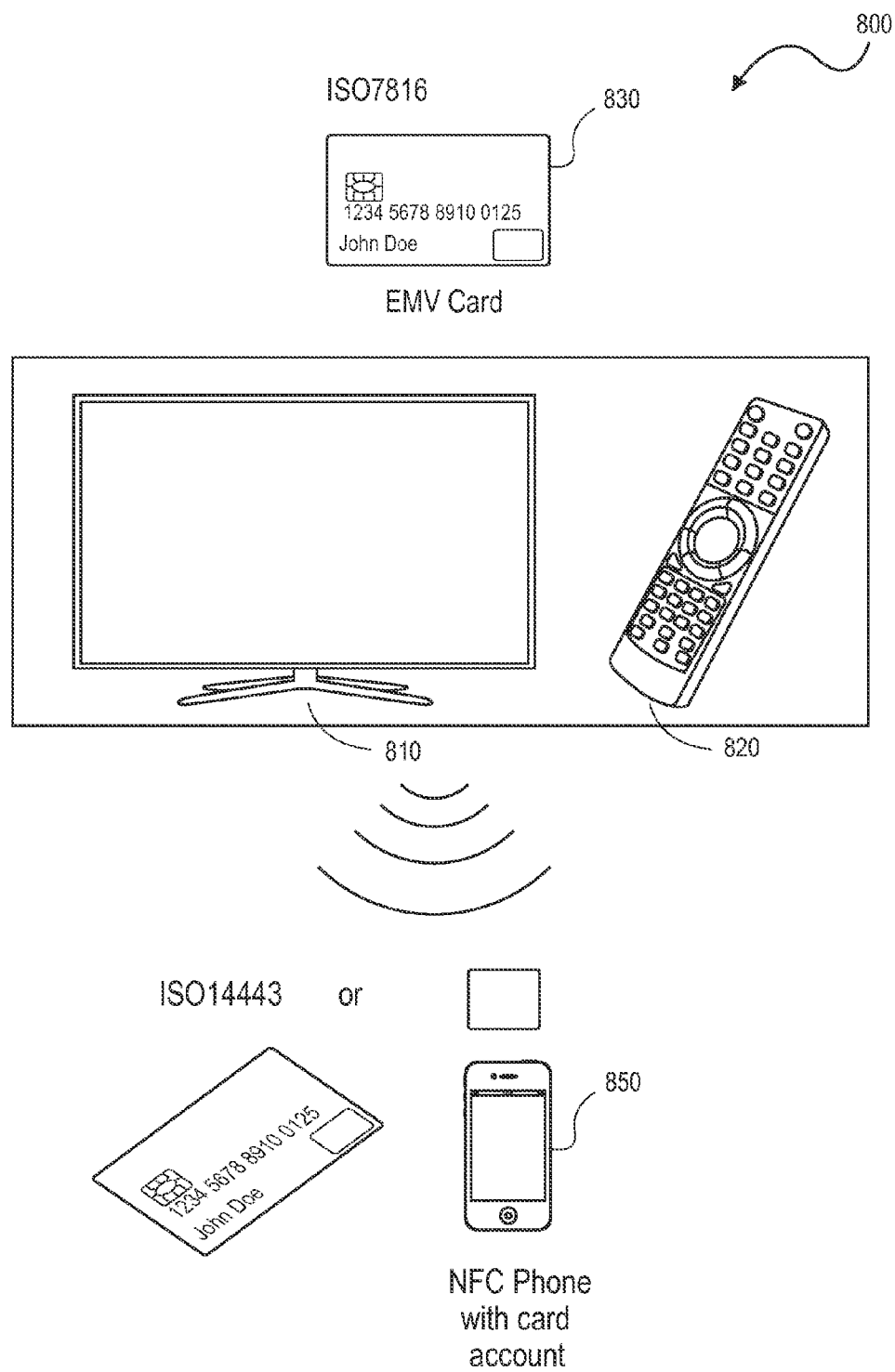
FIG. 8 is a block diagram illustrating the exchange of payment account information between a portable consumer device and a computing device or remote control according to certain embodiments of the invention.

FIG. 8 illustrates a system 800 for receiving payment data according to some embodiments of the present invention. Specifically, system 800 shows several ways a smart TV and/or a remote control may read payment account data from a portable consumer device (e.g., payment card or mobile device payment account data). System 800 illustrates some embodiments of how payment account data can be obtained when the payment application and/or payment server does not already have the appropriate payment account data.

Smart TV 810 and/or remote control device 820 may have one or more payment account data reader technologies integrated therein. In some embodiments, smart TV 810 and/or remote control device 820 include card reader hardware that is compatible with the ISO7816 standard for EMV cards (e.g., card 830). In some embodiments, smart TV 810 and/or remote control device 820 include a magnetic stripe reader for reading magnetic data from conventional payment cards. In some embodiments, the magnetic stripe reader may be a peripheral device (e.g., plugged into the smart TV or the remote control device).

In some embodiments, payment account data may be received by smart TV 810 and/or remote control device 820 wirelessly. In some embodiments, smart TV 810 and/or remote control device 820 include card reader hardware that is compatible with the ISO14443 standard for contactless cards (e.g., Visa Paywave card 840). In some embodiments, smart TV 810 and/or remote control device 820 include NFC hardware for communicating with NFC devices (e.g., a mobile device 850 with NFC capabilities). Payment account data can be transmitted from a portable consumer device to smart TV 810 and/or remote control device 820 in any other suitable fashion.

Figure 9B:
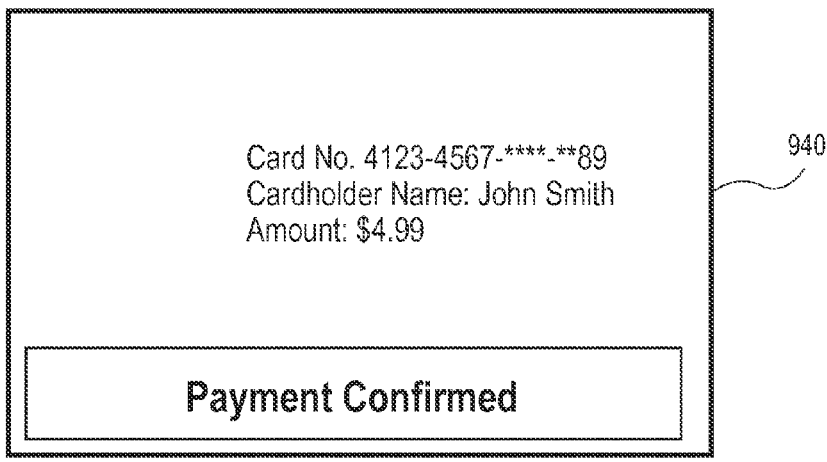
Figure 9B:
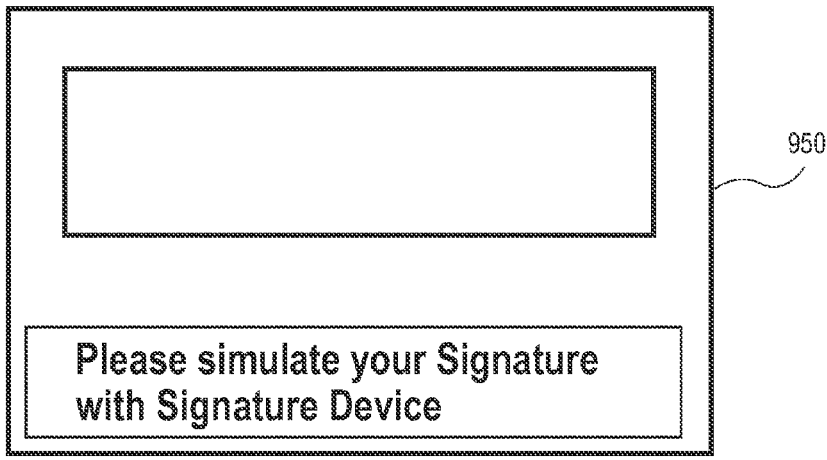
Figure 9B:
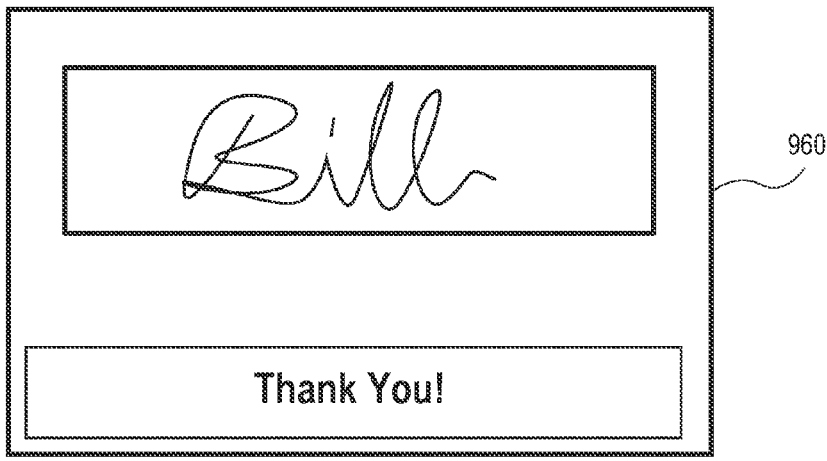

FIGS. 9A-9B are diagrams illustrating certain of the operations involved in conducting a payment transaction using a smart TV or similar device as the transaction would be experienced by a consumer, and one or more user interface displays that may be used in the performance of those operations according to embodiments of the invention.

User interface 910 is a user interface that can be used to select items (goods, services, media, etc.) to purchase. In some embodiments, a consumer may first select an item they wish to purchase by accessing an application store or other display on the smart TV. The application store may be generated by an AppStore client installed in the smart TV or may be generated by a server that is connected to the smart TV over the Internet. User interface 910 may be navigated using conventional user input devices, including a remote control device, mobile device, mouse, trackpad, etc. to select items (e.g., step 510 in FIG. 5). Information about the goods and/or services may be displayed on the user interface 910, including price, purchase options, descriptions, ratings, quantities, and the like. After selecting the desired item, the consumer may be asked to indicate how they wish to pay for the item.

User interface 920 is a user interface that can be used to select the payment method and/or display information about the item to be purchased (e.g., item identifier, price, etc.). User interface 920 is an example of a user interface that can be displayed as part of step 520 in FIG. 5. In some embodiments, payment account data is obtained by prompting the consumer to provide the payment account data. In some embodiments, the consumer manually enters the data. In some embodiments, the consumer presents a portable consumer device to the smart TV or remote control device. For example, the consumer may be promoted to insert a payment card into the remote control. In another example, the consumer may be prompted to "wave" an NFC-enabled mobile device near the smart TV.

The consumer may enable their payment device (e.g., a smart card, chip card, mobile device containing a contactless element, or other form of payment device configured to communicate with the remote controller in a contactless manner) to communicate and exchange data with the smart TV and/or remote control device. In some embodiments, payment account data transferred to the remote controller may then be stored in a data storage element of the remote controller. In some embodiments, the payment account information can be communicated to the smart TV using a suitable communication mechanism and protocol (e.g., Bluetooth, infrared, or other short range communication technology). In some embodiments, payment account data transferred to the smart TV may then be stored in a data storage element of the smart TV. In some embodiments, if the payment account information was previously provided to the remote controller, then the request from the payment module may be responded to by the remote controller without requiring action by the consumer.

In addition to, or instead of accessing the payment account information from the remote controller, the payment module may receive the information from a server connected to the smart TV over the Internet. The payment module may also receive the payment account information from a data storage element in the smart TV or a set-top device, etc. Further, for additional security, the payment account information may be encrypted or not stored in the remote controller (in which case the data obtained from the contactless payment device may transfer the payment account data to the remote controller, which then transmits it to the smart TV).

User interface 930 may be displayed when the authorization is in process. For example, a user interface such as user interface 930 can be displayed during the steps 530/540 in FIG. 5. A progress indicator and/or information about the item to be purchased (e.g., item identifier, price, etc.) may be displayed as part of user interface 930. If the payment is authorized, user interface 940 can be displayed. User interface 940 can include payment account data, consumer data, and/or a payment account. Some of the information may be redacted for security (e.g., a partial PAN may be displayed). User interface 940 is an example of a user interface that may be displayed as a part of step 560 in FIG. 5.

After the payment authorization process is completed, the consumer may be requested to input their signature to provide verification of their identity and/or serve as a non-repudiation mechanism. An example of a user interface prompting the consumer (e.g., step 610 in FIG. 6) for a signature is shown in user interface 950. User interface 950 prompts consumer to provide her signature. In some embodiments, a signature capture device (e.g., a remote control or other device) is used to provide the signature. In some embodiments, a smart TV captures the signature (i.e., the smart TV itself is the signature capture device). In some embodiments, the remote control and the signature capture device collectively sense the motion of the consumer and capture the consumer's signature. For example, the signature may be provided by moving the remote controller in a series of motions that represent the consumer's signature, with the motions being detected and interpreted by a sensor or sensors that are part of (or in a unit connected to) the smart TV.

In some embodiments, the signature may be input into an appropriate location on a form or in a text box. User interface 960 shows an example of signature data displayed on the display of the smart TV. In some embodiments, the signature image is not displayed. In some embodiments, a message indicating that the signature has been captured (or not) is displayed in lieu of, or in addition to, displaying an image of the signature. Omitting the signature display may be more secure in a public environment.

Certain embodiments of the present invention provide for more secure transaction because a signature is used for payment account holder verification. Embodiments of the present invention can provide for an effective mechanism to prevent repudiation of the transaction without using a handwritten signature and without using a signature pad (e.g., such as is used in convention touch and stylus-based POS terminals). Therefore, embodiments of the present invention provide a trusted non-repudiation mechanism that can be employed in online (e.g., card not present) transaction. This protects the issuer of a payment device by preventing a consumer from alleging that they were not the party who conducted a transaction when in fact they were. Account holder can also be protected, for example, because the non-repudiation mechanism may provide proof that the party conducting the transaction was not the account owner.

Signature capture disclosure herein is particularly advantageous and beneficial in the smart TV or other large display embodiments disclosed herein because the consumer's signature can be captured and viewed when the user is not near the display of the smart TV. For example, the smart TV display may be a 60-inch display and the consumer may be watching at a distance of, for example, 14 feet. It would be inconvenient for the consumer to use a wired input device, such as a mouse, to provide non-repudiation data. However, consumers viewing large smart TVs often are near a remote control for the smart TV and providing signature using the remote control is convenient.

In some embodiments, one or more of the functions, operations, processes or methods described herein (including the process of detecting the motion of the consumer and generating one or more of the user interface displays described or depicted with reference to FIGS. 9A and 9B) may be implemented by a suitable processor, data processing element, microprocessor, or other form of computing device that is programmed to execute a set of instructions. The set of instructions may be stored in a memory or other form of data storage element which can be accessed by the processor. The processor, data processing element, microprocessor, or other form of computing device may be contained in a remote server capable of communication with the smart TV, the remote controller, a separate unit (such as a set-top box or gaming console), or another suitable element.

Figure 10:
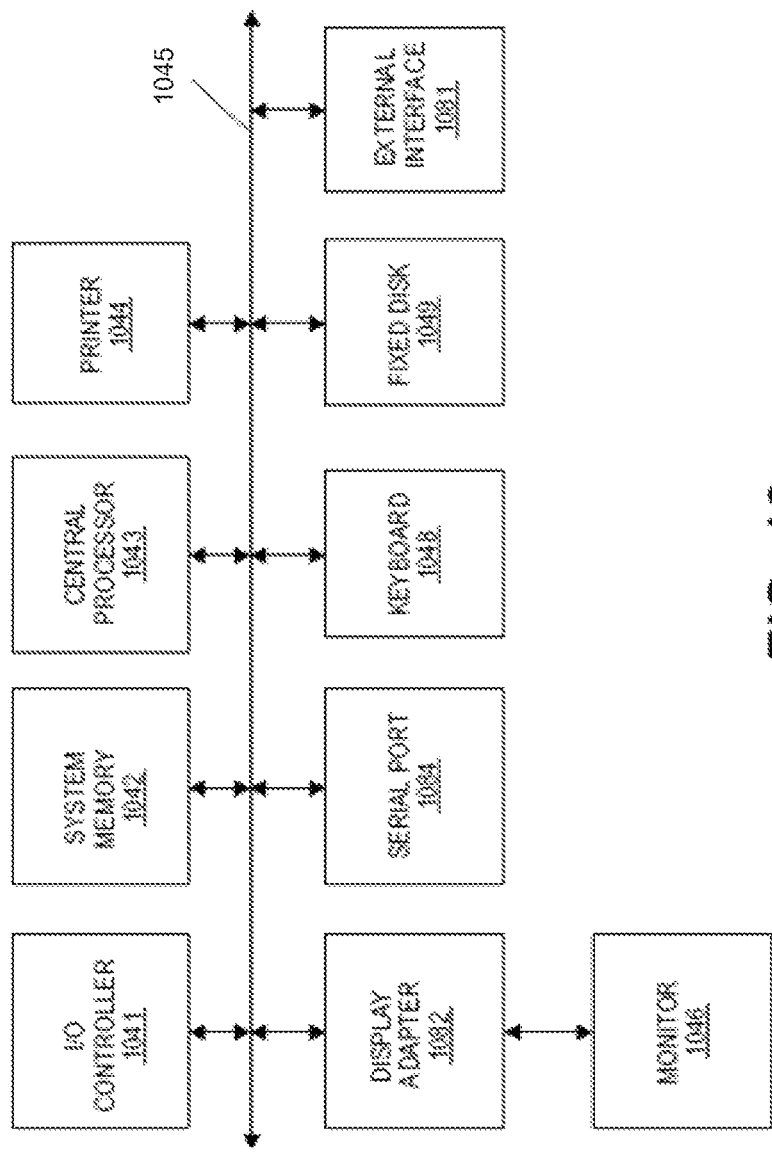
FIG. 10 is a block diagram of a computer system according to an embodiment of the invention.

FIG. 10 is a high level block diagram of a computer system that may be used to implement any of the entities or components described above (e.g., merchant validation server, venue validation server, and point of validation terminal, etc.). The subsystems shown in FIG. 10 are interconnected via a system bus 1045. Additional subsystems such as a printer 1044, keyboard 1048, fixed disk 1049, monitor 1046, which is coupled to display adapter 1082, and others are shown. Peripherals and input/output (I/O) devices, which couple to I/O controller 1041, can be connected to the computer system by any number of means known in the art, such as serial port 1084. For example, serial port 1084 or external interface 1081 can be used to connect the computer apparatus to a wide area network such as the Internet, a mouse input device, or a scanner. The interconnection via system bus 1045 allows the central processor 1043 to communicate with each subsystem and to control the execution of instructions from system memory 1042 or the fixed disk 1049, as well as the exchange of information between subsystems. The system memory 1042 and/or the fixed disk 1049 may embody a computer-readable medium.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

One or more features from any embodiment may be combined with one or more features of any other embodiment without departing from the scope of the technology.

As used herein, the use of "a", "an" or "the" is intended to mean "at least one", unless specifically indicated to the contrary.

What is claimed is:
1. A method for online shopping, the method comprising:
receiving, at an internet-connected computing device of a consumer, an input from the consumer to initiate a transaction for one or more goods and/or services selected via the internet-connected computing device, the internet- connected computing device configured to be operated with a remote control device;

generating, at the internet-connected computing device, a request for approval of the transaction, the request including a transaction identifier and payment account information;

transmitting the request for approval to an issuer computer via an internet connection;

receiving, at the internet-connected computing device, a response to the request for approval of the transaction, the response indicating whether the transaction was approved or denied;

responsive to receiving a response indicating that the transaction was approved by an issuer of a payment account corresponding to the payment account information, displaying a visual prompt, on a display of the internet-connected computing device, indicating that the consumer is to confirm the transaction by performing a signature gesture in the air;

detecting a motion of the consumer by a plurality of sensors including a first sensor of the internet-connected computing device and a second sensor of the remote control device, wherein the motion of the consumer comprises the signature gesture performed in the air and the detection of the motion of the consumer is based at least in part on first data received from the first sensor and second data received from the second sensor, the first data and the second data including data characterizing the signature gesture performed in the air;

processing, by the internet-connected computing device, the detected motion to generate a graphical image of the consumer's signature;

authenticating, by the internet-connected computing device, the remote control device with respect to signature capture based at least in part on third data from the remote control device including a cryptographic token having data configured to be verifiable with a cryptographic algorithm such that the authenticating fails unless a baseline version of the consumer's signature was previously obtained utilizing the particular remote control device;

responsive to successfully authenticating the remote control device, inserting the graphical image of the consumer's signature into a predetermined data field associated with a record of the transaction; and sending, by the internet-connected computing device, a transaction confirmation message including the graphical image of the consumer's signature to a payment processor, the issuer, or an acquirer via the internet connection.

2. The method of claim 1,
wherein the computing device is a smart television.

3. The method of claim 1,
wherein the detecting of the motion of the consumer comprises detecting the motion of the consumer's hand.

4. The method of claim 1,
wherein the detecting of the motion of the consumer comprises detecting the motion of a remote control.

5. The method of claim 1,
wherein the graphical image of the customer's signature corresponds to a graphical image file.

6. The method of claim 1,
wherein the payment account information is stored on the internet-connected computing device.

7. The method of claim 1,
wherein the internet-connected computing device comprises a television and the method further comprises displaying, by the television, the graphical image of the consumer's signature.

8. The method of claim 1,
wherein the consumer is inhibited from repudiating the transaction at least in part by utilizing an image recognition module to compare the graphical image of the consumer's signature into the predetermined data field with a previously captured baseline signature.

9. A non-transitory computer-readable storage medium having program code stored thereon, the program code including instructions that, when executed by a processor in an internet-connected computing device, cause the internet-connected computing device to execute a method comprising:

receiving, at the internet-connected computing device of a consumer, an input from the consumer to initiate a transaction for an item and/or service selected via the internet-connected computing device, the internet-connected computing device configured to be operated with a remote control device;

generating, at the internet-connected computing device, a request for approval of the transaction, the request including a transaction identifier and payment account information;

transmitting the request for approval to an issuer computer via an internet connection;

receiving, at the internet-connected computing device, a response to the request for approval of the transaction, the response indicating whether the transaction was approved or denied;

responsive to receiving a response indicating that the transaction was approved by an issuer of a payment account corresponding to the payment account information, displaying a visual prompt, on a display of the internet-connected computing device, indicating that the consumer is to confirm the transaction by performing a signature gesture in the air;

detecting a motion of the consumer by a plurality of sensors including a first sensor of the internet-connected computing device and a second sensor of the remote control device, wherein the motion of the consumer comprises the signature gesture performed in the air and the detection of the motion of the consumer is based at least in part on first data received from the first sensor and second data received from the second sensor, the first data and the second data including data characterizing the signature gesture performed in the air;

processing, by the internet-connected computing device, the detected motion to generate a graphical image of the consumer's signature;

authenticating, by the internet-connected computing device, the remote control device with respect to signature capture based at least in part on third data from the remote control device including a cryptoaraphic token having data configured to be verifiable with a cryptoaraphic algorithm such that the authenticating fails unless a baseline version of the consumer's signature was previously obtained utilizing the particular remote control device;

responsive to successfully authenticating the remote control device, inserting the graphical image of the consumer's signature into a predetermined data field associated with a record of the transaction; and sending, by the internet-connected computing device, a transaction confirmation message including the graphical image of the consumer's signature to a payment processor, the issuer, or an acquirer via the internet connection.

10. An internet-connected computing device of a consumer, the internet-connected computing device comprising:
a processor;
a non-transitory computer-readable medium communicatively coupled with the processor facilitating, at least:
an interface configured to communicate with one or more hardware modules for capturing an image of a simulation of a consumer signature; and
a control logic coupled to the interface, the control logic being configured to, at least:
receive an input from a consumer to initiate a transaction for an item and/or service selected via an internet-connected computing device, the internet-connected computing device configured to be operated with a remote control device;
generate a request for approval of the transaction, the request including a transaction identifier and payment account information;
transmit the request for approval to an issuer computer via an internet connection;
receive a response to the request for approval of the transaction, the response indicating whether the transaction was approved or denied;
responsive to receiving a response indicating that the transaction was approved by an issuer of a payment account corresponding to the payment account information, display a visual prompt, on a display of the internet-connected computing device, indicating that the consumer is to confirm the transaction by performing a signature gesture in the air;
detect a motion of the consumer by a plurality of sensors including a first sensor of the internet-connected computing device and a second sensor of the remote control device, wherein the motion of the consumer comprises the signature gesture performed in the air and the detection of the motion of the consumer is based at least in part on first data received from the first sensor and second data received from the second sensor, the first data and the second data including data characterizing the signature gesture performed in the air;
process the detected motion to generate a graphical image of the consumer's signature;
authenticate the remote control device with respect to signature capture based at least in part on third data from the remote control device including a cryptographic token having data configured to be verifiable with a cryptographic algorithm such that the authenticating fails unless a baseline version of the consumer's signature was previously obtained utilizing the particular remote control device;
responsive to successfully authenticating the remote control device, insert the graphical image of the consumer's signature into a predetermined data field associated with a record of the transaction; and
send a transaction confirmation message including the graphical image of the consumer's signature to a payment processor, the issuer, or an acquirer via an internet connection.

11. The computing device of claim 10, wherein the first sensor comprises a camera.

12. The computing device of claim 10, wherein the first sensor comprises an infrared sensor.

13. The computing device of claim 10, wherein the control logic is further configured to receive the payment account information from a server computer.

14. The computing device of claim 10, further comprising a portable consumer device reader, wherein the control logic is further configured to:
receive the payment account information from the portable consumer device reader.

15. A system comprising:
a computing device of a consumer with a display and configured to be operated with a remote control device, wherein the computing device is utilized at least to select one or more goods and/or services for purchase using a portable consumer device associated with a payment account;
a payment application module configured to, at least:
receive an input from a consumer to initiate a transaction,
generate a request for approval of the transaction,
transmit the request for approval of the transaction,
receive a response to the request for approval of the transaction,
responsive to receiving a response indicating that the transaction was approved by an issuer of a payment account corresponding to the payment account information, display a visual prompt, on a display of the internet-connected computing device, indicating that the consumer is to confirm the transaction by performing a signature gesture in the air, and
send a transaction confirmation message including a graphical image of the consumer's signature to a payment processor, the issuer, or an acquirer,
wherein the response indicates whether the transaction was approved or denied; and
a signature capture module configured to, at least:
detect a motion of the consumer by a plurality of sensors including a first sensor of the computing device and a second sensor of the remote control device, wherein the motion of the consumer comprises the signature Gesture performed in the air and the detection of the motion of the consumer is based at least in part on first data received from the first sensor and second data received from the second sensor, the first data and the second data including data characterizing the signature gesture performed in the air,
process the detected motion,
generate the graphical image of the consumer's signature, and
authenticate the remote control device with respect to signature capture based at least in part on third data from the remote control device including a cryptographic token having data configured to be verifiable with a cryptographic algorithm such that the authenticating fails unless a baseline version of the consumer's signature was previously obtained utilizing the particular remote control device,
wherein responsive to successfully authenticating the remote control device, the graphical image of the consumer's signature is inserted into a predetermined data field associated with a record of the transaction.

16. The system of claim 15, wherein the computing device is a smart television.

17. The system of claim 15, wherein the image of the signature is displayed on the computing device.

* * * * *